(12) United States Patent
Bilgen et al.

(10) Patent No.: US 12,525,046 B2
(45) Date of Patent: Jan. 13, 2026

(54) REAL ID AND ENHANCED ID DETECTION BY ARTIFICIAL INTELLIGENCE

(71) Applicant: Base64.ai, Inc., New York, NY (US)

(72) Inventors: Ozan Eren Bilgen, New York, NY (US); Can Korkut, Ankara (TR); Ihsan Soydemir, Munich (DE)

(73) Assignee: Base64.AI, Inc., New York, NY (US)

( * ) Notice: Subject to any disclaimer, the term of this patent is extended or adjusted under 35 U.S.C. 154(b) by 277 days.

(21) Appl. No.: 18/336,888

(22) Filed: Jun. 16, 2023

(65) Prior Publication Data

US 2024/0420495 A1    Dec. 19, 2024

Related U.S. Application Data

(63) Continuation of application No. 18/307,682, filed on Apr. 26, 2023.

(51) Int. Cl.
| | |
|---|---|
| *G06V 30/41* | (2022.01) |
| *G06T 7/73* | (2017.01) |
| *G06V 10/20* | (2022.01) |
| *G06V 30/146* | (2022.01) |

(52) U.S. Cl.
CPC .............. *G06V 30/41* (2022.01); *G06T 7/75* (2017.01); *G06V 10/255* (2022.01); *G06V 30/1473* (2022.01); *G06T 2207/20084* (2013.01)

(58) Field of Classification Search
None
See application file for complete search history.

(56) References Cited

U.S. PATENT DOCUMENTS

| | | |
|---|---|---|
| 11,715,310 B1 | 8/2023 | Sammons et al. |
| 2017/0372460 A1 | 12/2017 | Zagaynov et al. |
| 2019/0278986 A1* | 9/2019 | Nepomniachtchi .. G06V 10/243 |
| 2019/0294661 A1 | 9/2019 | Sarkar |
| 2020/0184210 A1 | 6/2020 | Malabarba |
| 2021/0326630 A1 | 10/2021 | Chen et al. |
| 2021/0334529 A1 | 10/2021 | Zakharov et al. |
| 2022/0309813 A1 | 9/2022 | Melchy et al. |
| 2022/0414370 A1 | 12/2022 | Pribble et al. |
| 2023/0090313 A1 | 3/2023 | Mittal et al. |
| 2023/0351790 A1 | 11/2023 | Zhu et al. |
| 2024/0221411 A1* | 7/2024 | Wells ................... G06V 30/413 |

* cited by examiner

*Primary Examiner* — Andrew H Lam
(74) *Attorney, Agent, or Firm* — Sean Lynch; Lynch LLP

(57) ABSTRACT

Embodiments of the inventive subject matter are directed to AI systems that are designed to identify whether identification cards or driver's licenses issued to states from the United States are compliant with either Real ID or Enhanced ID laws. When a driver's license or ID card is Real ID compliant, it includes a visual indicator in the form of a small start on the front of the card (e.g., a start located generally at the top right of the card). When a driver's license is Enhanced ID compliant, it will include a small image of an American flag somewhere on the front of the card. AI systems of the inventive subject matter are trained to identify these visual indicators to determine whether an ID is Real ID compliant or Enhanced ID compliant.

14 Claims, 3 Drawing Sheets

Intersection

Union

REAL ID AND ENHANCED ID DETECTION BY ARTIFICIAL INTELLIGENCE

This application claims priority to and is a continuation of U.S. patent application Ser. No. 18/307,682, filed Apr. 26, 2023. All extrinsic materials identified in this application are incorporated by reference in their entirety.

FIELD OF THE INVENTION

The field of the invention is artificial intelligence implemented to identify visual indicators on identification cards and driver's licenses.

BACKGROUND

The background description includes information that may be useful in understanding the present invention. It is not an admission that any of the information provided in this application is prior art or relevant to the presently claimed invention, or that any publication specifically or implicitly referenced is prior art.

The ability to quickly and accurately determine whether a driver's license is compliant with the Real ID Act of 2005, Enhanced ID compliant, or neither, is becoming increasingly necessary, especially as federal law has mandated use of a Real ID compliant driver's license to board domestic flights. With digital services, in particular, time is of the essence. For many services, users are required to upload verification of identification, and with new federal requirements coming into effect, verifying identity as well as verifying federal compliance with certain regulatory schemes is becoming increasingly important. When an identification card or driver's license in the United States is compliant with the Real ID Act of 2005, it includes a star-shaped visual indicator, and when an identification card or driver's license is an Enhanced ID, it includes an American flag visual indicator as well as the word "enhanced." If a driver's license or identification card complies with neither regulatory scheme, it will include the words "Federal Limits Apply" (or words to that effect, including, from time to time, "Nor For Federal," "Drivers Privilege Card," "Not Valid For Federal," "Not Valid For Official," "Not Intended For Federal," "Not Acceptable For Federal," "Not Valid For Identification," and "Not For Real Id Purposes")

With a digital service that requires identity verification, one way to conduct these verifications is to employ human workers to check every uploaded image. Such a worker would check for visual indicators that signify compliance or lack thereof. This would be time consuming and expensive, as such a system is not easily scalable, is limited only to those hours when a person is working, and can be prone to human error. With the advent of artificial intelligence, computers can be trained to do more and more complex work, including work that involves machine vision and other tasks that, in the past, a computer would simply be unable to perform.

Thus, there exists a need for an artificial intelligence system that is designed to quickly check for the presence of certain visual indicators on United States identification cards and driver's licenses and to make determinations about regulatory compliance.

SUMMARY OF THE INVENTION

The present invention provides apparatus, systems, and methods directed to artificial intelligence systems that are capable of determining whether a driver's license or ID card from one of the states of the United States is Real ID compliant or an Enhanced ID.

In one aspect of the inventive subject matter, a method of using artificial intelligence to identify visual indicators on identification cards and driver's licenses includes the steps of: receiving, by an artificial intelligence system via upload, a digital file, where the digital file comprises a document that is either an identification card or driver's license from one of the states of the United States; transforming the digital file into a tensor; applying a deep learning model to the tensor, where the deep learning model has been trained to identify visual indicator candidate locations, each visual indicator candidate location having a visual indicator type and a confidence value; where the visual indicator type is a Real ID visual indicator or an Enhanced ID visual indicator; identifying, by applying the deep learning model, a set of visual indicator candidate locations on the document; applying non-maximum suppression to filter the set of visual indicator candidate locations, resulting in a final visual indicator location having a final confidence value and a final visual indicator type; and confirming the final visual indicator type associated with the final visual indicator location by determining that the final confidence value exceeds a confidence value threshold.

In some embodiments, the confidence value threshold is 0.4 when the final visual indicator type is a Real ID visual indicator. In some embodiments, the confidence value threshold is 0.65 when the final visual indicator type is an Enhanced ID visual indicator. The step of applying non-maximum suppression can use an intersection over union threshold of 0.45, and the step of applying non-maximum suppression can use a filtering confidence value threshold of 0.25.

In some embodiments, the method also includes the step of conducting optical character recognition on the file and concluding that the document is a Real ID compliant Enhanced ID based on the presence of the word "enhanced." In some embodiments, the method also includes the step of converting the digital file from its original format into portable network graphics (PNG) format to create a PNG image such that the PNG image is converted into the tensor.

In another aspect of the inventive subject matter, a method of using artificial intelligence to identify visual indicators on identification cards and driver's licenses includes the steps of: receiving, by an artificial intelligence system via upload, an image file, wherein the image file comprises a document that is either an identification card or driver's license from one of the states of the United States; transforming the image file into a tensor; applying a deep learning model to the tensor to identify a set of visual indicator candidate locations, where each visual indicator candidate location comprises an area bound by a rectangle; where each visual indicator candidate location is associated with a visual indicator type and a confidence value; where the visual indicator type is a Real ID visual indicator or an Enhanced ID visual indicator; applying non-maximum suppression to filter the set of visual indicator candidate locations, resulting in a final visual indicator location having a final confidence value and a final visual indicator type; and confirming the final visual indicator type associated with the final visual indicator location by determining that the final confidence value exceeds a confidence value threshold.

In some embodiments, the confidence value threshold is 0.4 when the final visual indicator type is a Real ID visual indicator, and the confidence value threshold can be 0.65 when the final visual indicator type is an Enhanced ID visual indicator. The step of applying non-maximum suppression can use an intersection over union threshold of 0.45, and the step of applying non-maximum suppression can further use a filtering confidence value threshold of 0.25.

In some embodiments, the method also includes step of conducting optical character recognition on the file and concluding that the document is a Real ID compliant Enhanced ID based on the presence of the word "enhanced." And in some embodiments, the method also includes the step of converting the digital file from its original format into portable network graphics (PNG) format to create a PNG image such that the PNG image is converted into the tensor.

One should appreciate that the disclosed subject matter provides many advantageous technical effects including a practical implementation of a deep learning model that has been trained to identify specific visual indicators. Various objects, features, aspects, and advantages of the inventive subject matter will become more apparent from the following detailed description of preferred embodiments, along with the accompanying drawing figures in which like numerals represent like components.

DETAILED DESCRIPTION

Figure 1:
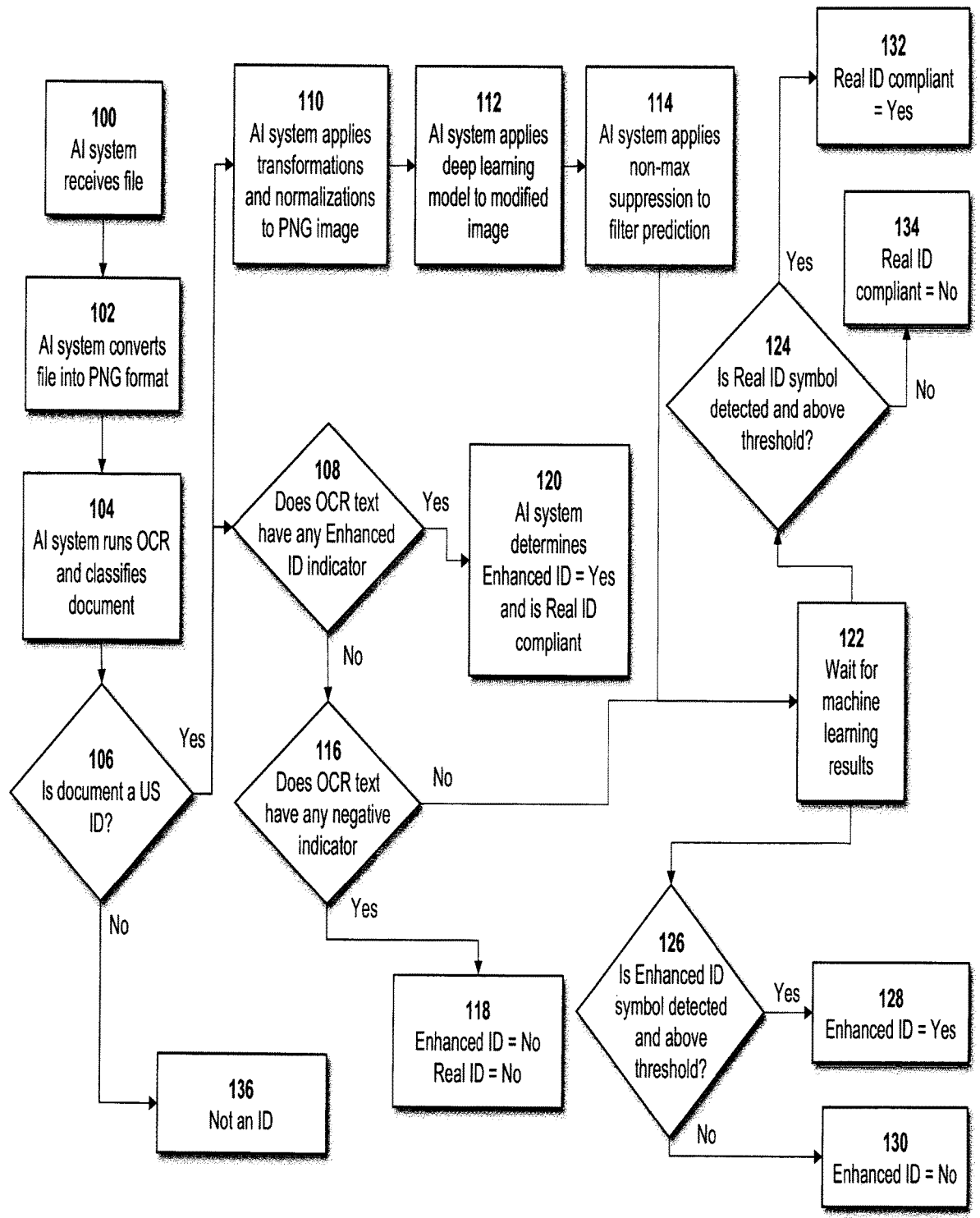
FIG. 1 is a flowchart showing steps that can be taken by an AI system of the inventive subject matter in identifying whether a document features is Real ID compliance or Enhanced ID compliant.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

It should be noted that any language directed to a computer should be read to include any suitable combination of computing devices, including servers, interfaces, systems, databases, agents, peers, Engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided in this application is prior art or relevant to the presently claimed invention, or that any publication specifically or implicitly referenced is prior art.

FIG. 1 is a flow chart describing how an AI system of the inventive subject matter can function. AI systems described in this application use artificial intelligence to identify whether a US identification card that is uploaded as an image file is Real ID compliant, an Enhanced ID, neither, or both. Because embodiments of the inventive subject matter are directed to determining Real ID and Enhanced ID compliance of an uploaded identification card, systems and methods described in this application are generally directed to identification cards issued in the United States by the various states.

Uploaded files can feature driver's licenses, identification cards, or any other type of identification card that features one or more visual indicators that mean the card meets the United States requirements to be Real ID compliant or an Enhanced ID. A Real ID compliant driver's license or identification card that meets the requirements of the Real ID Act of 2005. The Real ID Act was passed in response to the 9/11 terrorist attacks, and it establishes minimum security standards for driver's licenses and identification cards issued by U.S. states and territories. Real ID compliant driver's licenses and identification cards have a star in the upper right corner of the card. They can also have a number of other security features, such as a photo of the driver, a magnetic strip, and a barcode.

In this application, references to the AI system should be understood as referring to software running on a platform server, which can be configured as one or more servers (e.g., a cloud platform). Thus, when reference is made to a platform server, it should likewise be understood as being part of, or cooperating with, the AI system operating thereon. The AI system can be, e.g., part of a backend of a website or software application. In some embodiments, the AI system can be accessed by API call and can be made accessible from any website or software application.

Although describing steps as occurring in sequence, in parallel, or in some particular order is often convenient or necessary, steps described in this application should be understood as occurring as soon as it is practical for each step to take place. Unless a series of steps must be undertaken sequentially (e.g., by explicit description or as a matter of function), the steps described in this application do not need to be taken in any particular order.

In step 100, the AI system receives a file containing a document (e.g., an image file showing an identification card of some kind). Files uploaded to the AI system can include images in any image format including PNG, JPG, GIF, TIFF, WEBP, RAW, EPS, and so on, including proprietary image formats like Apple's HEIC. In addition to image files, the AI system can also receive documents uploaded in a variety of document-based formats. For example, the AI system can receive file types including: Microsoft Office formats including DOC, DOCX, XLS, XLSX, PPT, PPTX; Open Office formats including ODS, ODT, ODP; PDF-both digital and image-only files are supported; ZIP directories containing any supported file format; email message files (e.g., MSG) including any files or documents contained in or attached to up uploaded email or emails. It should be understood that the list of file types above is not exhaustive and should instead be considered demonstrative of variety of types of files an AI system of the inventive subject matter can receive.

Thus, a user can take a picture of their driver's license and then upload that picture to a platform server running the AI system. FIGS. 2-5 show driver's licenses that could be uploaded to the AI system. These images are used to help explain various steps and processes described in this application. In step 102, the AI system converts an uploaded file to a desired filetype (e.g., a more useful format for image processing). An example of a useful format for image file uploads is the Portable Network Graphics format (*. PNG). PNG is a raster-graphics file format that supports lossless data compression. PNG was developed as an improved, non-patented replacement for Graphics Interchange Format. If the file received is already in a desired format, then step 102 involves checking whether converting to a different format is necessary and, if not, then no action is taken.

There are a few benefits to using PNG files for AI and machine vision. PNG files are a lossless image format, which means that they do not lose any quality when they are compressed or decompressed. This makes them a good choice for storing images for use with AI and machine vision, which work best with images that are accurate and precise. A lossless format ensures an AI or machine vision system is able to detect issues with the content of an image instead of issues that can arise due to compression.

PNG is not the only format that AI systems of the inventive subject matter can convert files into. For example, in some embodiments, the AI system can convert an uploaded file from its original format to another suitable image format that is selected based on a variety of factors including expected file degradation resulting from compression balanced against the benefits of storing a compressed image file. Suitable image files can include any of the image files mentioned above.

In step 104, the AI system performs optical character recognition (OCR) on the uploaded file and classifies the document. Document classification can occur as described in, e.g., U.S. patent application Ser. No. 18/307,682, which this application claims priority to and that is incorporated in its entirety to this application. Once a document is classified, the AI system has determined that the document is a particular type of document (e.g., an identification card, an invoice, an insurance form, etc.). The system checks in step 106 whether the document is a United States driver's license or a United States identification card, all of which are referred to generally using the term "US ID" for ease of discussion in the following paragraphs. A United States driver's license can be, e.g., a driver's license from any state, and a United States identification card can be an identification card from any state. Any US ID discussed in this application can be Real ID compliant and/or an Enhanced ID. If the document in the image is a US ID of some kind, then the AI system moves to one or both of steps 108 and 110. If the document in the image is not a US ID of some kind, then the AI system can conclude in step 136 that the document is not a US ID and therefore is not Real ID compliant or an Enhanced ID.

In step 108, the AI system checks whether any of the text contained on the US ID that is discerned via OCR indicates that the US ID is an Enhanced ID. For example, as shown in Figure X [show an enhanced ID], Enhanced IDs feature the word "enhanced" somewhere on the front of the document. When the AI system encounters a text indication that the US ID is an Enhanced ID, the AI system can then conclude in step 120 that the US ID is an Enhanced ID. In cases where the AI system does not encounter any text indication that the US ID is an Enhanced ID, then in step 116, the AI system checks whether any of the text extracted from the US ID includes any negative indicators. An example of a negative indicator is the text "Federal Limits Apply," which indicates that the identification card those words appear on does not meet the federal Real ID requirements. Thus, in step 118, the AI system concludes that the US ID is neither an Enhanced ID nor Real ID compliant, But if no negative indicators exist, then the AI system moves to step 122, where it waits for machine learning results. In instances where no negative indicators exist, and the AI system was unable to identify any wording indicating that US ID is an Enhanced ID, and the AI system also failed to find any text indication that the US ID, then that means the AI system must rely on alternative means of making a determination as to whether the US ID is either an Enhanced ID or a Real ID compliant. Thus, in step 122, the AI system awaits the results of steps 110, 112, and 114.

In step 110, the AI system applies transformations and normalizations, as needed, to the PNG formatted image file that has a document in it that has been classified as a US ID. In some embodiments, the AI system applies transformations to the image, which is stored as a matrix. In some embodiments, the image is resized to a desired resolution (e.g., 640×480) and stored as an intermediate matrix, the intermediate matrix is transposed, the transposed intermediate matrix is then converted to a three-dimensional tensor, and a fourth dimension is added to the tensor. The final result of these transformations is a tensor that represents the image.

Image normalization can be implemented to change the range of pixel intensity values in an image. This can be done to make an image more consistent as compared to other images, to improve the contrast, or to make the image more suitable for a particular application. In embodiments of the inventive subject matter, image normalization can be implemented to make it easier for a deep learning model to identify the contents of an image. One common example of image normalization is to scale the pixel values so that they range from 0 to 1. This can be done by subtracting the minimum pixel value from all pixel values, and then dividing by the difference between the maximum and minimum pixel values.

For example, consider an image with a range of pixel values from 0 to 255. If the minimum pixel value is 100, and the maximum pixel value is 200, then normalizing the image would involve subtracting 100 from each pixel value, and then dividing by 100. This would result in a new range of pixel values from 0 to 1.

To improve the contrast of an image, normalization can be used to improve the contrast of an image by stretching the pixel values so that they cover a wider range. This can make the image easier to see and can help to highlight details. To make the image more suitable for a particular application, normalization can be used to make an image more suitable for a particular application by scaling the pixel values to a specific range. For example, an image that will be displayed on a web page might be normalized to a range of 0 to 255, while an image that will be used for machine learning might be normalized to a range of −1 to 1. And normalization can be used to make an image more consistent with other images by scaling the pixel values so that they have the same average value. This can be useful for combining images or for comparing images.

Figure 2:
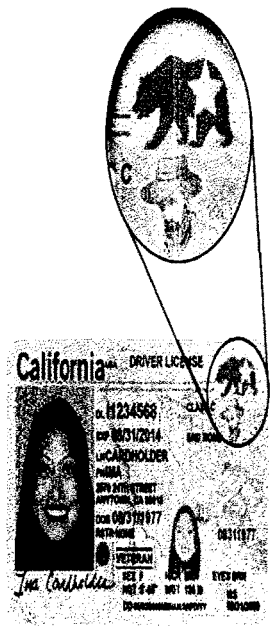
FIG. 2 shows an example of a California driver's license that is Real ID compliant.
Figure 3:
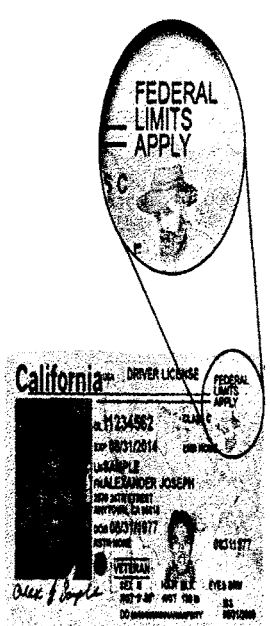
FIG. 3 shows an example of a California driver's license that is neither Real ID compliant nor Enhanced ID compliant.
Figure 4:
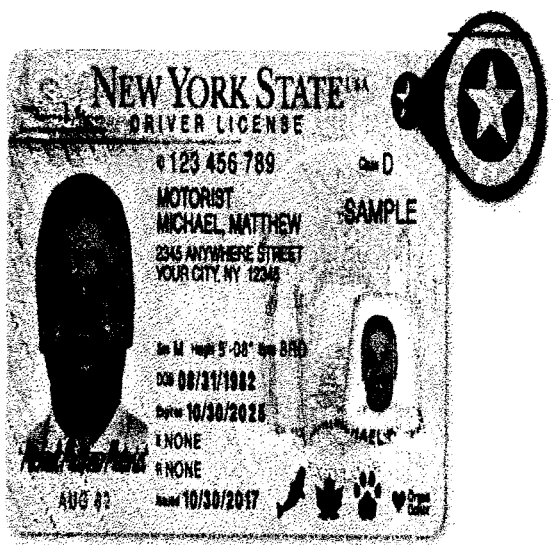
FIG. 4 shows an example of a New York State driver's license that is Real ID compliant.
Figure 5:
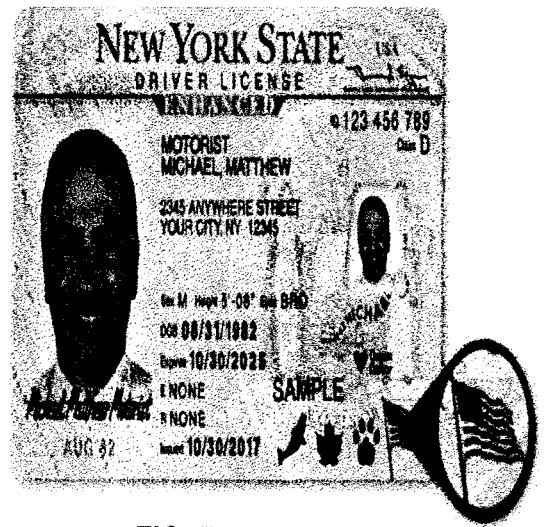
FIG. 5 shows an example of a New York State driver's license that is an Enhanced ID.

In step 112, the AI system then applies machine learning to the now-modified image to generate predictions. AI systems of the inventive subject matter can employ a deep learning model to analyze the modified image to generate predictions. Predictions in this step thus refer to candidate regions for the visual indicators that the deep learning model has been trained to identify. Each prediction can be associated with a visual indicator (e.g., Real ID compliant or Enhanced ID) and can thus correspond to a bounded area on the image (e.g., a rectangle, or some other regular or irregular shape). The deep learning model in this step has been optimized to recognize symbolic indicators on United Stated identification cards, including indicators associated with Real ID compliant US IDs and Enhanced IDs. For example, California driver's licenses that meet Real ID requirements feature a bear with a star on it near the upper right portion of the card, as shown in FIG. 4. New York driver's licenses, which can either be Enhanced ID compliant or Real ID compliant, feature a star inside a circle at the top right to indicate the identification card is Real ID compliant—as shown in FIG. 2—or an American flag at the bottom right to indicate the identification card is Enhanced ID compliant—as shown in FIG. 3. Thus, in step 112, the deep learning model identifies regions on the input image in which a probability exists that the target visual indicators is present.

Although the examples of visual indicators establishing Real ID and Enhanced ID compliance shown in this application are current as of time of writing, because AI systems of the inventive subject matter use deep learning models that can be trained to identify any type of visual indicator corresponding to Real ID or Enhanced ID compliance, as regulations or visual indicators change, systems of the inventive subject matter can change accordingly without impacting performance.

In step 114, after the AI system has used the deep learning model to make predictions about the presence or absence of visual indicators relating to either Enhanced ID or Real ID compliance, the AI system then employs a technique called non-maximum suppression to filter the deep learning model's predictions.

Non-maximum suppression in this context refers to a process that takes predictions (e.g., guesses about locations where the deep learning model thinks it has found visual indicators associated with either Real ID or Enhanced ID compliance) from the deep learning model and narrows down those predictions. Each prediction from step 112 can be created with some associated qualities, such as a confidence score and an overlap threshold. By applying non-maximum suppression, the AI system takes those predictions and outputs a list of filtered proposals. In some embodiments, the result of applying non-maximum suppression is a single prediction that can be verified using its associated confidence value as described below. Each prediction generated by the deep learning model comprises a visual indicator candidate location along with an associated visual indicator type (e.g., either a Real ID visual indicator or an Enhanced ID visual indicator). Candidate locations can be bounded by rectangles as demonstrated in FIG. 7.

In embodiments of the inventive subject matter, non-maximum suppression can function as follows. Upon receiving an input comprising a list of prediction areas denoted as B, corresponding confidence scores S, and an overlap threshold N, the AI system would first select the prediction having the highest confidence score, remove it from B and add it to the final proposal list denoted as D (where, e.g., D is initially empty). Next, the AI system compares this prediction with one or more of the other predictions (in some embodiments, it is compared to all other predictions). The AI system then calculates the "intersection over union" (IOU) of this prediction with every other prediction in B. If the IOU is greater than the threshold N, then the AI system removes that prediction from B. The AI system then, again, takes the next prediction with the highest confidence from the remaining predictions in B and removes it from B to add it to D. Again, the AI system calculates the IOU of this prediction with predictions in B and eliminates the predictions in B that have a higher IOU than threshold N. This process is repeated until there are no predictions left in B, resulting in D being populated with a filtered set of predictions.

Figure 6:
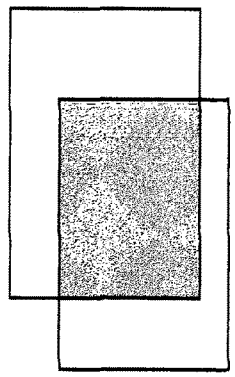
FIG. 6 shows how intersection over union is calculated.
Figure 6:
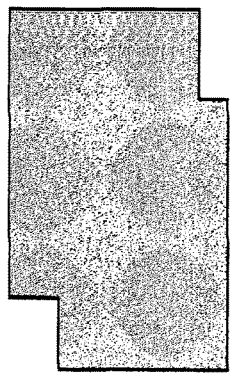

Intersection over union describes a way of measuring the overlap between two predictions. FIG. 6 shows an example of how this can work by comparing one prediction to another. This process can be expanded to comparing one prediction to many. The intersection comprises the area of overlap between two predictions, and the union comprises the area of both predictions when combined together. To compute IOU, the intersection area is divided by the union area, resulting in a number between 0 and 1. If the resulting value is above some threshold, then the prediction is eliminated, and if it at or below that threshold, then the prediction is kept (e.g., by adding the prediction to a set of kept predictions).

Figure 7:
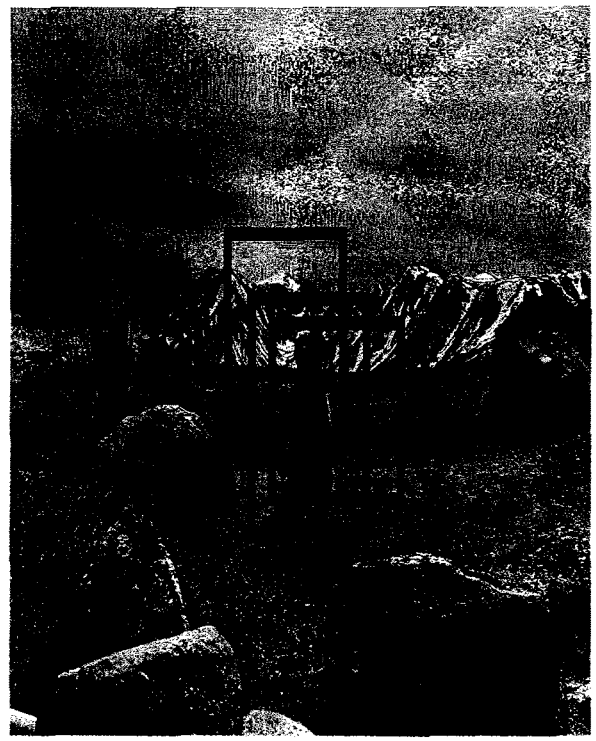
FIG. 7 shows how non-maximum suppression results in a final prediction.
Figure 7:

FIG. 7 shows an example of the same image with predictions overlaid before the application of non-max suppression (top) and after the application of non-max suppression (bottom). One challenge in implementing non-maximum suppression is in deciding what threshold values should be implemented. Threshold values for non-maximum suppression can include, e.g., 0.25 for the confidence threshold value and 0.45 for the IOU threshold value. Thus, confidence threshold values can range from 0.15 to 0.35, and IOU threshold values can range from 0.3 to 0.5. These values are best suited for AI systems of the inventive subject matter when applying non-maximum suppression to determine whether a Real ID or Enhanced ID visual indicator exists on a US ID that the AI system is tasked with processing. By applying these threshold values, predictions can be systematically eliminated to reduce the number of predictions down to those that are most likely to accurately contain a visual indicator, and because each prediction can be associated with a specific visual indicator, the AI system is left with one or more predictions having associated confidence values. Both confidence and IOU thresholds described in this application are expressed as normalized values ranging from 0-1.

Step 122 is included to demonstrate that the AI system eventually reaches a point where multiple branches of the flow chart must be completed before the system can proceed further. As indicated in the flow chart, once step 116 results in a "no" and once the AI system has completed step 114, then the system can move past step 122. Thus, in instances where either step 116 or 114 is completed before the other, the AI system waits until both are completed before proceeding to either of steps 124 or 126.

In step 124, the AI system checks whether a Real ID visual indicator was detected by the deep learning model applied to the US ID present in the uploaded image. In situations where the deep learning model indicates that a Real ID visual indicator is present on the subject US ID, then the AI system can conclude that the US ID is Real ID compliant according to step 132. If, on the other hand, the deep learning model does not detect the presence of a Real ID visual indicator on the subject US ID, then the AI system can conclude that the US ID is not Real ID compliant according to step 134. Whether a Real ID indicator is detected is based on the prediction the AI system has made and that prediction's associated confidence value. To move to step 132, the confidence value of a prediction associated with a Real ID visual indicator that results after applying non-max suppression in step 114 should preferably be above 0.40, which has been discovered to generate reliable results in embodiments of the inventive subject matter. In some embodiments, this threshold can range from 0.20 to 0.60 and can be adjusted as-needed to produce the best results. If the prediction's associated confidence value is lower than that threshold, then the AI system reaches step 134.

In step 126, the AI system checks whether an Enhanced ID visual indicator was detected by the deep learning model applied to the US ID present in the uploaded image. In situations where the deep learning model indicates that an Enhanced ID visual indicator is present on the subject US ID, then the AI system can conclude that the US ID is Enhanced ID compliant according to step 128. If, on the other hand, the deep learning model does not detect the presence of an Enhanced ID visual indicator on the subject US ID, then the AI system can conclude that the US ID is not Enhanced ID compliant according to step 130. To move to step 128, the confidence value of a prediction associated with an Enhanced ID visual indicator that results after applying non-max suppression in step 114 should preferably be above 0.65, which has been discovered to generate reliable results in embodiments of the inventive subject matter. In some embodiments, this threshold can range from 0.45 to 0.85 and can be adjusted as-needed to produce the best results. If the prediction's associated confidence value is lower than that threshold, then the AI system reaches step 130.

Thus, specific systems and methods directed to the use of artificial intelligence and deep learning models to detect whether a United States driver's license or other identification card is Real ID or Enhanced ID compliant have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A method of using artificial intelligence to identify visual indicators on identification cards and driver's licenses, the method comprising the steps of:
   receiving, by an artificial intelligence system via upload, a digital file, wherein the digital file comprises a document that is either an identification card or driver's license from one of the states of the United States;
   transforming the digital file into a tensor;
   applying a deep learning model to the tensor, wherein the deep learning model has been trained to identify visual indicator candidate locations, each visual indicator candidate location having a visual indicator type and a confidence value;
   wherein the visual indicator type is a Real ID visual indicator or an Enhanced ID visual indicator;
   identifying, by applying the deep learning model, a set of visual indicator candidate locations on the document;
   applying non-maximum suppression to filter the set of visual indicator candidate locations, resulting in a final visual indicator location having a final confidence value and a final visual indicator type; and
   confirming the final visual indicator type associated with the final visual indicator location by determining that the final confidence value exceeds a confidence value threshold.

2. The method of claim 1, wherein the confidence value threshold is 0.4 when the final visual indicator type is a Real ID visual indicator.

3. The method of claim 1, wherein the confidence value threshold is 0.65 when the final visual indicator type is an Enhanced ID visual indicator.

4. The method of claim 1, wherein the step of applying non-maximum suppression uses an intersection over union threshold of 0.45.

5. The method of claim 4, wherein the step of applying non-maximum suppression further uses a filtering confidence value threshold of 0.25.

6. The method of claim 1, further comprising the step of conducting optical character recognition on the file and concluding that the document is a Real ID compliant Enhanced ID based on the presence of the word "enhanced".

7. The method of claim 1, further comprising the step of converting the digital file from its original format into portable network graphics (PNG) format to create a PNG image such that the PNG image is converted into the tensor.

8. A method of using artificial intelligence to identify visual indicators on identification cards and driver's licenses, the method comprising the steps of:
- receiving, by an artificial intelligence system via upload, an image file, wherein the image file comprises a document that is either an identification card or driver's license from one of the states of the United States;
- transforming the image file into a tensor;
- applying a deep learning model to the tensor to identify a set of visual indicator candidate locations, wherein each visual indicator candidate location comprises an area bound by a rectangle;
- wherein each visual indicator candidate location is associated with a visual indicator type and a confidence value;
- wherein the visual indicator type is a Real ID visual indicator or an Enhanced ID visual indicator;
- applying non-maximum suppression to filter the set of visual indicator candidate locations, resulting in a final visual indicator location having a final confidence value and a final visual indicator type; and
- confirming the final visual indicator type associated with the final visual indicator location by determining that the final confidence value exceeds a confidence value threshold.

9. The method of claim 8, wherein the confidence value threshold is 0.4 when the final visual indicator type is a Real ID visual indicator.

10. The method of claim 8, wherein the confidence value threshold is 0.65 when the final visual indicator type is an Enhanced ID visual indicator.

11. The method of claim 8, wherein the step of applying non-maximum suppression uses an intersection over union threshold of 0.45.

12. The method of claim 11, wherein the step of applying non-maximum suppression further uses a filtering confidence value threshold of 0.25.

13. The method of claim 8, further comprising the step of conducting optical character recognition on the file and concluding that the document is a Real ID compliant Enhanced ID based on the presence of the word "enhanced".

14. The method of claim 8, further comprising the step of converting the digital file from its original format into portable network graphics (PNG) format to create a PNG image such that the PNG image is converted into the tensor.

* * * * *